US008723644B2

(12) United States Patent
Morehead (10) Patent No.: US 8,723,644 B2
(45) Date of Patent: May 13, 2014

(54) POSITION LOACTOR BEACON (76) Inventor: James Bruce Morehead, Petaluma, CA (US)

( * ) Notice: Subject to any disclaimer, the term of this patent is extended or adjusted under 35 U.S.C. 154(b) by 213 days.

(21) Appl. No.: 13/385,120

(22) Filed: Feb. 2, 2012

(65) Prior Publication Data

US 2012/0200394 A1    Aug. 9, 2012

Related U.S. Application Data (60) Provisional application No. 61/462,608, filed on Feb. 4, 2011.

(51) Int. Cl.
*G08B 7/06*    (2006.01)

(52) U.S. Cl.
USPC .... 340/8.1; 340/540; 340/539.13; 340/573.1; 340/539.32; 340/6.1; 273/331; 473/578; 342/386; 446/213

(58) Field of Classification Search
CPC ........... G08B 3/00; G08B 5/00; G04C 21/00; G01N 33/00; G01S 1/20; G01S 1/02
USPC ................ 340/573.1, 8.1, 6.1, 539.1, 539.32; 446/213; 473/571, 199, 578; 273/317.2, 400; 342/386
See application file for complete search history.

(56) References Cited

U.S. PATENT DOCUMENTS

| 4,675,683 | A   | * | 6/1987  | Robinson et al. | 342/386   |
|-----------|-----|---|---------|-----------------|-----------|
| 5,112,055 | A   | * | 5/1992  | Barnhill        | 473/199   |
| 5,575,483 | A   | * | 11/1996 | Dineen et al.   | 273/317.2 |
| 6,068,260 | A   | * | 5/2000  | Dean            | 273/400   |
| 6,573,834 | B1  | * | 6/2003  | Grimani et al.  | 340/573.1 |
| 6,679,927 | B2  | * | 1/2004  | Strongin        | 446/213   |
| 7,270,077 | B2  | * | 9/2007  | Beck            | 116/210   |
| 7,422,531 | B2  | * | 9/2008  | Tarng et al.    | 473/446   |
| 8,075,430 | B1  | * | 12/2011 | Hester          | 473/578   |
| 2011/0080285 | A1 | * | 4/2011 | Howson et al.  | 340/540   |
| 2013/0303314 | A1 | * | 11/2013 | Tackett        | 473/571   |

* cited by examiner

*Primary Examiner* — Benjamin C Lee
*Assistant Examiner* — Chico A Foxx
(74) *Attorney, Agent, or Firm* — George W. Wasson (57) ABSTRACT The device of this invention is for use in marking, locating and retrieving an object with respect to the user, and has particular usefulness for hunters and the like to assist in locating a hunted game that has fallen some distance from the hunter. The device is an object that can be fastened to or hung from a user, can be easily removed from its attachment, is hand-holdable in size, and light weight for being launched or thrown toward the location to be marked. Once places and after a reasonable time delay, the device can emit sound, light or electronic signals that can assist the user in finding the marked location. The device can be have other uses as an assist in returning to a located place after the device has been launched or placed.

13 Claims, 9 Drawing Sheets

POSITION LOACTOR BEACON

CROSS REFERENCE TO RELATED APPLICATIONS

This application claims the benefit of U.S. Provisional Application No. 61/462,608 filed Feb. 4, 2011.

STATEMENT REGARDING FEDERALLY-SPONSORED RESEARCH OR DEVELOPMENT

Not applicable

REFERENCE TO MICROFICHE APPENDIX

Not applicable

BACKGROUND OF THE INVENTION

This invention relates to a device for use in marking, locating and retrieving an object with respect to the user and it has usefulness for hunters and the like to assist in locating a hunted game that has been wounded or killed and has fallen at some distance from the hunter or for other users that have a similar object of search (a golf ball for example). The device of this invention is an article that can be thrown to the expected location of the downed game or other object where it will provide a beacon signal to the user to assist in returning to a marked position identified to the user as the location of the device where the user had positioned it with respect to an object of search.

SUMMARY OF THE PRESENT INVENTION

The device is designed to provide ease of placement by being a hand held device that is light in weight, easily grasped, shaped to avoid bouncing or sliding after placement, aerodynamically shaped to avoid interference with air movement in placing, actuatible for supplying retrieval information, provides sounds and light that are generally non-frightening to the surrounding area or inhabitants, providing a reasonably long life in operation, and relocatable by visual, sound and electronic signals.

While the device is useful for hunters, it can also be used to permit the location and retrieval of any object or location in an area where vegetation or other land related materials could prevent ease of search and retrieval. The device has particular uses to a hunter who may need to find a downed game bird or animal that has moved after being shot.

OBJECTS OF THE PRESENT INVENTION

An object of the present invention is a device that can be used by any user that wants to be able to mark the general area where an object might be "lost" because of the surrounding conditions while the user might be distracted by interfering events, so that the user has a means for returning to the marked area to retrieve a placed marker.

A further object, in accord with the preceding object, is to provide in a placed marking device sounds, light or electronic receivable transmissions that will permit locating and retrieving the placed marking device.

Another object, in accord with the preceding objects, is a marking device that can be released from the user, easily thrown by a user, and designed to reduce possibilities of the device rolling or bouncing from the area where it landed after being thrown by the user.

Another object, in accord with the preceding objects, is a marking device that includes a plurality of audible, visual, or dectable signals that can lead to the location of the thrown device.

A further object, in accord with the preceding objects, is the establishment of a beacon like device that can direct the user in returning to the location where the device has been placed.

Further objects and features will be readily apparent from the following specification and drawings.

BRIEF DESCRIPTION OF THE DRAWINGS

For purposes of illustration, these figures are not necessarily drawn to scale. In all of the figures, like components wherever possible are designated by like numerals.

DETAILED DESCRIPTION OF THE INVENTION

Throughout the following description, specific details are set forth in order to provide a more thorough understanding of the invention; however, the invention may be practiced without these particulars. In other instances, well known elements have been shown or described to avoid unnecessarily obscuring the invention. Accordingly, the specification and drawings are to be regarded in an illustrative, rather than a restrictive, sense.

Throughout the following description of the elements of the present invention and it use, the device will be described as a beacon, downed game finder, bird finder; however, the device may have many other uses in providing a marked position for something to which the user wants to return after attending to some other task or duty. In that regard, the invention should be considered as useful in many other fields not fully described herein.

Figure 1:
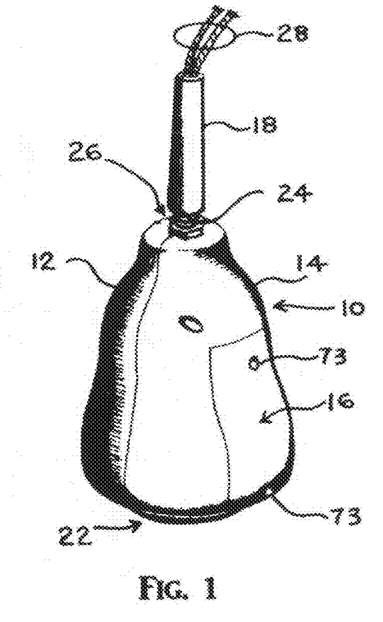
FIG. 1 is a front elevation perspective view of the present invention with the actuation plug in storage or stand-by position.
Figure 2:
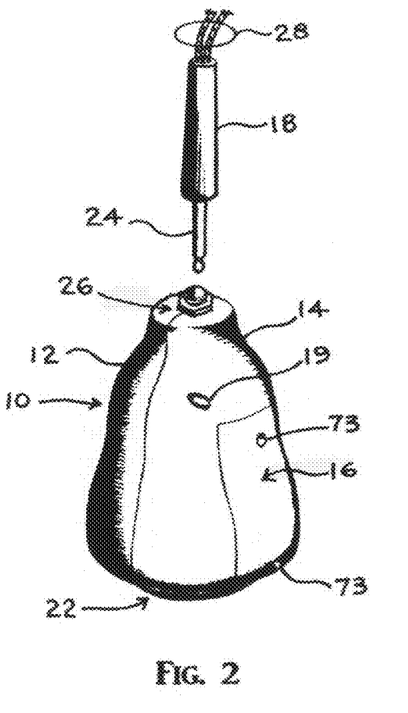
FIG. 2 is a front elevation perspective view similar to FIG. 1 but with the actuation plug disconnected placing the device in operational condition.

FIGS. 1 and 2 illustrate one form that the present invention may take, herein shown as a device 10 of hand held size and shape that will permit it to contain desired elements and to be thrown or placed in a reasonably identifiable location. The shape of the device is to some extent controlled by the elements it is intended to enclose, and as herein shown, is somewhat pear shaped. The device is aerodynamically configured to permit it to pass through ambient temperature air that may include rain or snow. The shape is further designed to avoid bouncing or rolling along a placement area and the material of construction of the exterior is selected to be sturdy and impact resistant so as to prevent damage when deployed in its use.

As shown in FIGS. 1 and 2, the device 10 of the present invention is a three part enclosure with sides 12, 14, and a battery enclosure 16 and an actuating plug or pin 18 at the top. The parts 12, 14 and 16 are preferably formed of many available plastic materials, such as ABS, having specifications that will be sturdy and will permit the transmission of electrical, light and sound. The larger end or bottom end of the device at its base 22 forms the device in a pair like shape with sloping sides that are intended to create a structure that will not roll easily from a place where it has been placed or thrown.

Figure 3:
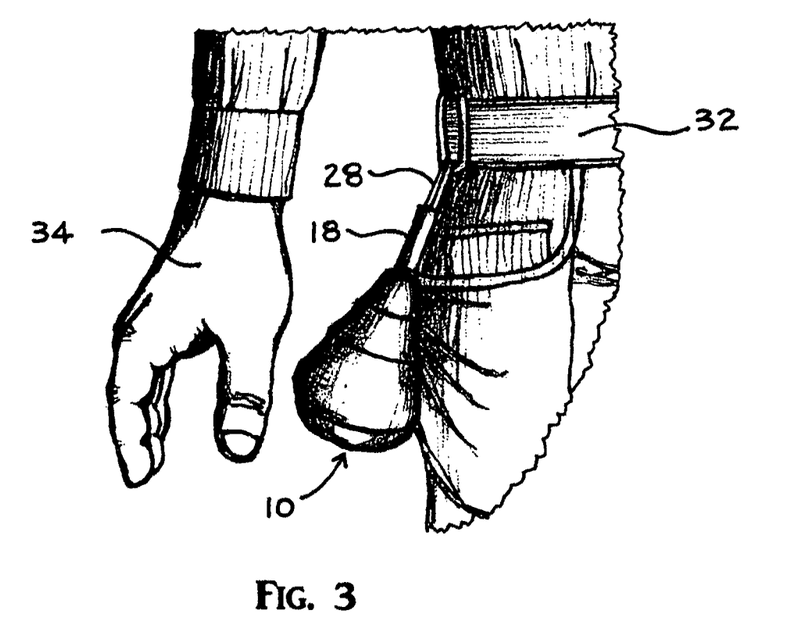
FIG. 3 is an illustration of the present invention as attached to a belt, or the like, of a user and showing hand access to the device.
Figure 4:
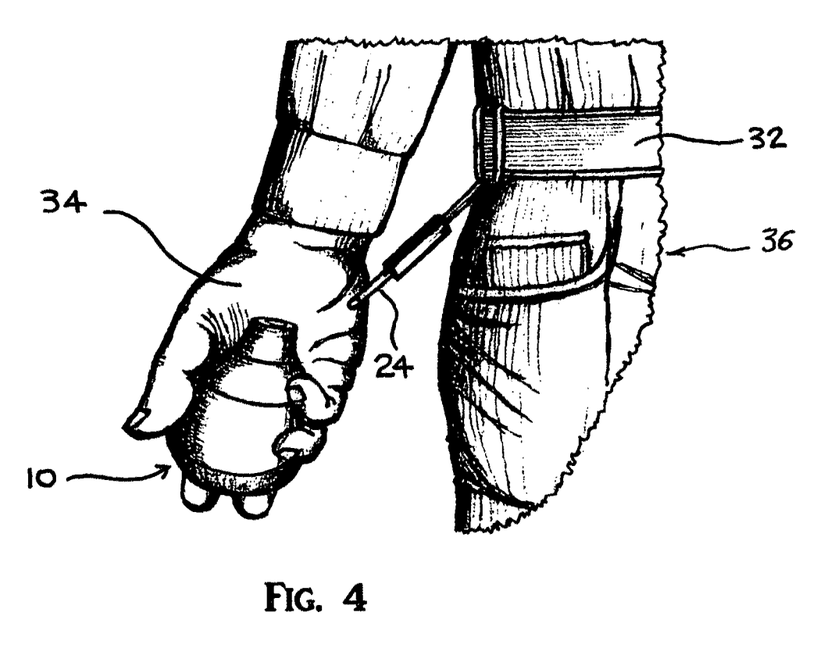
FIG. 4 is an illustration similar to FIG. 3 and showing the hand of a user removing the device from its attachment to the user and in handheld position for placement.
Figure 5:
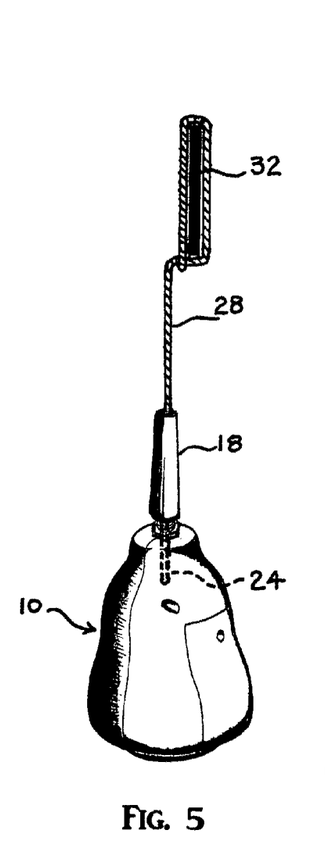
FIG. 5 is an enlarged view of the present device and its attachment cord attached to a belt (in section) of a user in storage or un-actuated position.
Figure 6:
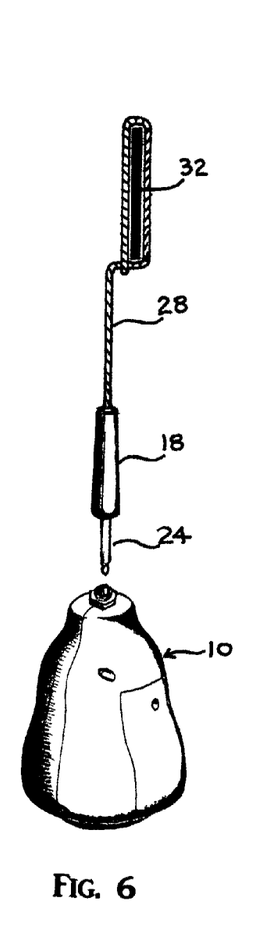
FIG. 6 is a view similar to FIG. 5 showing the attachment cord removed from the device releasing the device for placement.
Figure 7:
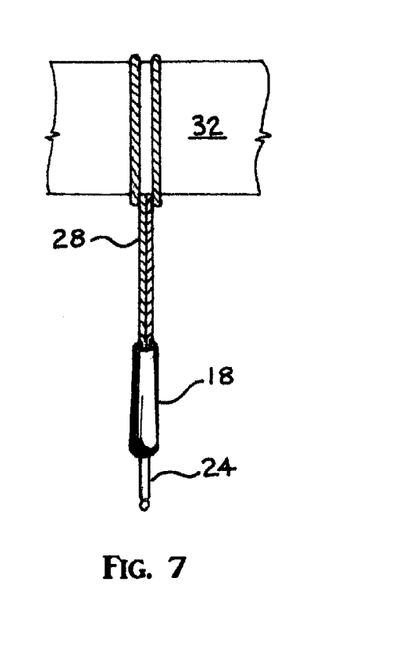
FIG. 7 illustrates the attachment cord looped around a user's belt.
Figure 8:
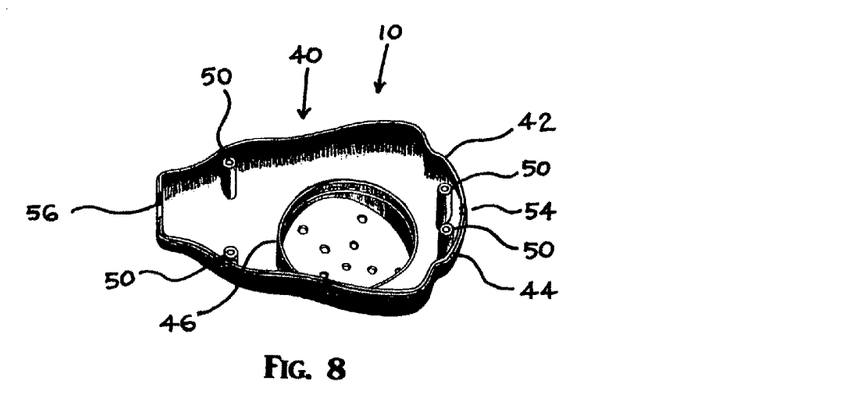
FIG. 8 is a perspective view of the interior of the speaker side of the molded enclosure portion of the present invention.

The plug or pin 18 has one end 24 that is adapted to be inserted into a port 26 at the top of the device. The plug or pin 18 has a lanyard or rope like material attached at it upper end that is attachable to a user's body or clothing as shown in FIG. 3 where the lanyard or rope 28 is looped about the belt 32 of the user. FIG. 3 also shows the relative size and shape of the device 19 with respect to the hand 34 or body of a user 36. FIG. 4 illustrates the device 10 released from the plug 24 and loop 28 and in the hand 34 of the user ready for deployment as needed. FIGS. 5, 6 & 7 illustrate the device 10 with plug 34 inserted in its attachment to the device and with rope 28 attached by a loop to the belt 32, or other structure, on a user. FIG. 6 illustrates the device released from the user and FIG. 7 illustrates the pin or plug still attached to the user after the device 10 has been released and is in use.

FIGS. 8, 9, 10 and 11 illustrate one side of the structure forming the casing of the device 10. In the perspective view of FIG. 8 one side of the device 10 is shown as a cup shaped part 40 having a continuous perimeter edge 42 that is formed with a sealing structure 44 along the edge that is designed and constructed to mate with a sealing surface, for example a groove, on another part to be described. The interior of the one side 40 is formed with an interior speaker support surface 46 having sound exit holes 48 and a plurality of mounting structures 50 that will cooperate with assembly screws 51 or the like that will pass through and thread into aligned structures on a second side element to be described. Also within the cup shaped part 40 are a plurality of strengthening ribs 52. At the base end 28 a small indentation is formed in the perimeter 42 to provide for the mounting and exterior exposure of a light emitting device (LED) that will be described hereinafter. At the smaller end of the cup shaped form 40 another indentation 56 is formed in the perimeter to provide for the mounting of the port 26 as will be described hereinafter.

Figure 9:
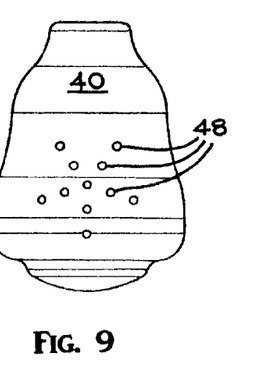
FIG. 9 is a side plan view of the exterior of FIG. 8.

FIG. 9 illustrates the exterior surface 54 and the sound exit holes 48 associated with a speaker or sound device within the cup shaped body 40 as described.

Figure 10:
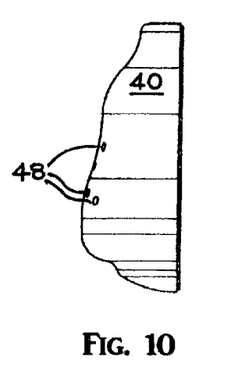
FIG. 10 is a side plan view of one side of the molded portion shown in FIG. 8, the opposite side of the FIG. 8 showing would be the same as FIG. 10.

FIG. 10 illustrates the exterior contour of the cup shaped part 40 that establishes the pear shaped form and illustrates the sound exit holes 48 and provides for interior space for the speaker and other parts that will be described hereinafter.

Figure 11:
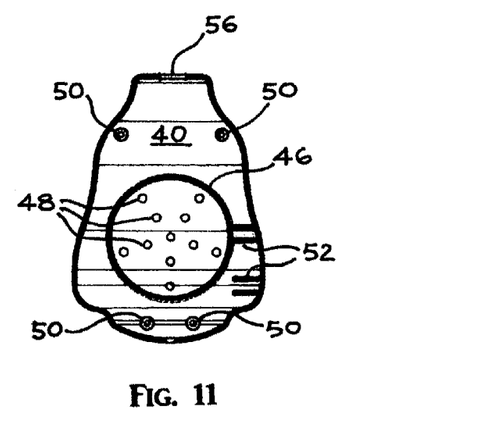
FIG. 11 is an interior plan view of the enclosure shown in FIG. 8.

FIG. 11 is a plan view illustrating the central location of the speaker support 46, the sound exit holes 48, the mounting structures 50, the strengthening ribs, the indentation 54 for the light element, and the indentation 56 for the port 26.

Figure 12:
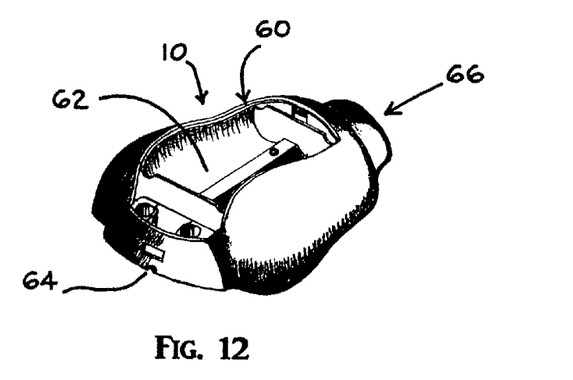
FIG. 12 is a perspective view of the exterior of the battery side of the molded enclosure portion of the present invention.

FIGS. 12, 13, 14 and 15 illustrate the second part 60 that combines with the first part 40 to form the casing enclosure that defines the device 10. This FIG. 12 is the exterior of the second part 60 and includes a formed indentation 62 for batteries as will be described. The indentation 64 in its perimeter cooperates with the indentation 54 in the first cup shaped part 40 of the enclosure to accommodate a light as will be described; and an indentation 66 at the opposite end cooperates with the indentation 56 in the first part 40 to accommodate the port 26.

Figure 13:
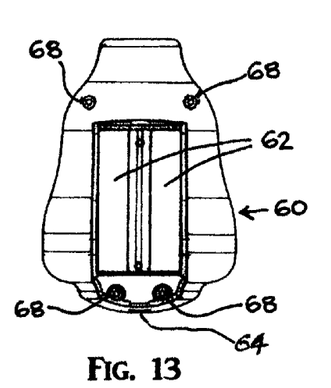
FIG. 13 is a plan view of the exterior of FIG. 12.

FIG. 13 is an exterior plan view of the second part 60 showing the location of the battery indentation 62 and structures 68 for cooperation with mounting screws 51 previously described.

Figure 14:
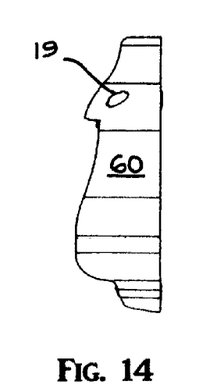
FIG. 14 is a side plan view of one side of the molded portion shown in FIG. 12, the opposite side of FIG. 12 would be the same as FIG. 14.

FIG. 14 is a side view illustrating the contour of the exterior of the second part 60 that forms the pear shaped contour.

Figure 15:
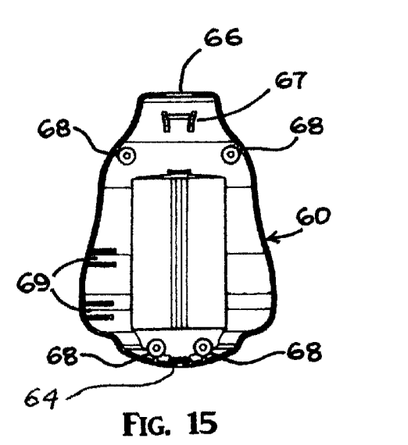
FIG. 15 is an interior plan view of the enclosure shown in FIG. 12.

FIG. 15 is a plan view of the interior of the second part 60 showing the interior space for the batteries, the mounting structures 68, the strengthening ribs 69, the indentation 64 for a light, the indentation 66 for the port 26, and a support structures 67 for the interior position of the plug or pin when inserted into the device. Perimeter edges 63 are formed with grooves 65 adapted to cooperate with the mating structure 42 of part 40.

Figure 16:
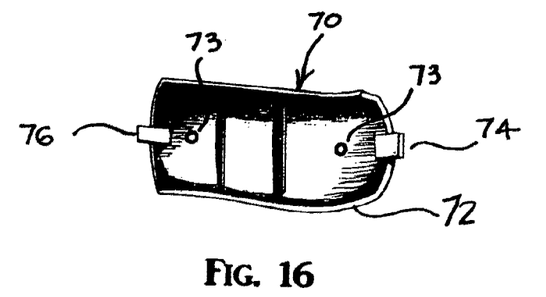
FIG. 16 is a perspective view of the molded battery cover for the battery area within the side of the device as shown in FIGS. 12, 13, 14 and 15.

FIG. 16 is a perspective view of the interior of the battery cover portion 70 for the battery compartment shown in FIG. 12 to enclose the exterior device 10 with surfaces 72 around its perimeter that match and mate with surfaces of the opening in FIG. 12 and also include attachment extensions 74 and 76 that mate with suitable locking slots on the exterior of the second part enclosure 60 and holes 73, as shown in FIGS. 1 and 2, for suitable mounting screws. For mounting the cover to the second part 60

Figure 17:
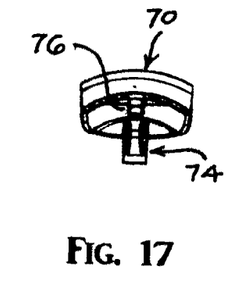
FIG. 17 is an end view of the molded battery cover portion shown in FIG. 16.
Figure 18:
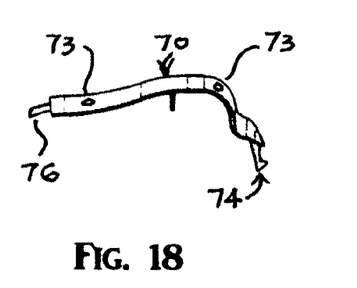
FIG. 18 is a side view of the molded battery cover of FIG. 16.
Figure 19:
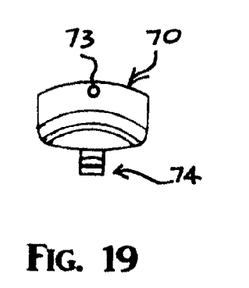
FIG. 19 is an end view of the molded battery cover portion shown in FIG. 16 and from the opposite end from the showing in FIG. 17.

FIG. 17 is an end view from the left side of FIG. 16. FIG. 18 is a side view of the battery compartment cover 70, showing its contour as compatible with the contour of the present device as shown in FIG. 14 and also showing the attachment extensions 74 and 76. FIG. 19 is an end view from the right side of FIG. 16. When installed to enclose the battery compartment, the surfaces 72 mate and seal against surfaces shown in FIG. 12. When the two parts 40 and 60 are joined together to form the casing of the device 10, attachment screws 51 pass through the exterior holes 19 shown in FIGS. 1 and 2. The sides of the two parts join as a dado and groove and screws 51 pass up through the battery side 60 through hollow mounting structures 50 and screw into structure 68 from the other side.

Figure 20:
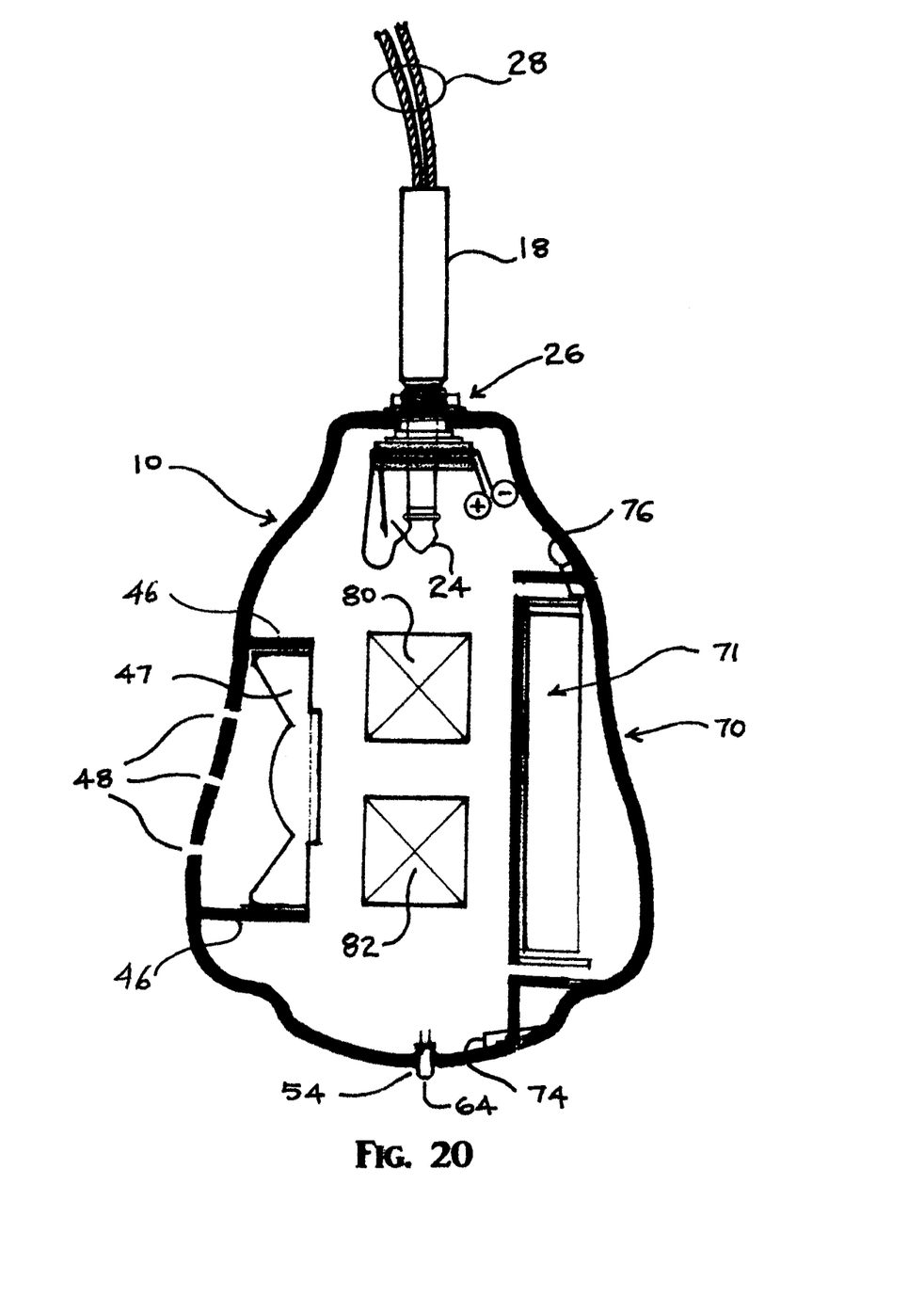
FIG. 20 is a plan view of the interior of the device of the present invention.

FIG. 20 is a section-like view through the device 10 of the present invention and illustrates the relative position of components enclosed within the enclosure formed by mating cover 40 with cover 60. As illustrated, the device encloses, at the top, the plug or pin 24 entering through port 26 and shows the device in "un-actuated" position with electrical contacts OPEN as will be described hereinafter. The battery compartment cover 70 encloses the compartment when extensions 74 and 76 are engaged with the mating surfaces of enclosure cover 60 and enclose a suitable number of batteries 71. A speaker 47 is shown as it would be supported within the speaker support 46 and in alignment with sound exit holes 48. A light source 64 (LED) is shown exiting through indentation 54 in the enclosure. In the interior of the illustrated device two of several possible operational elements are shown in block diagram form. Shown in FIGS. 1 and 2 are an integrated circuit board 80 and a ground positioning system (GPS) device 82, both having functions that will be described hereinafter. Electrical connections between the enclosed devices are not shown in this view and will be described hereinafter.

Figures 21, 22:
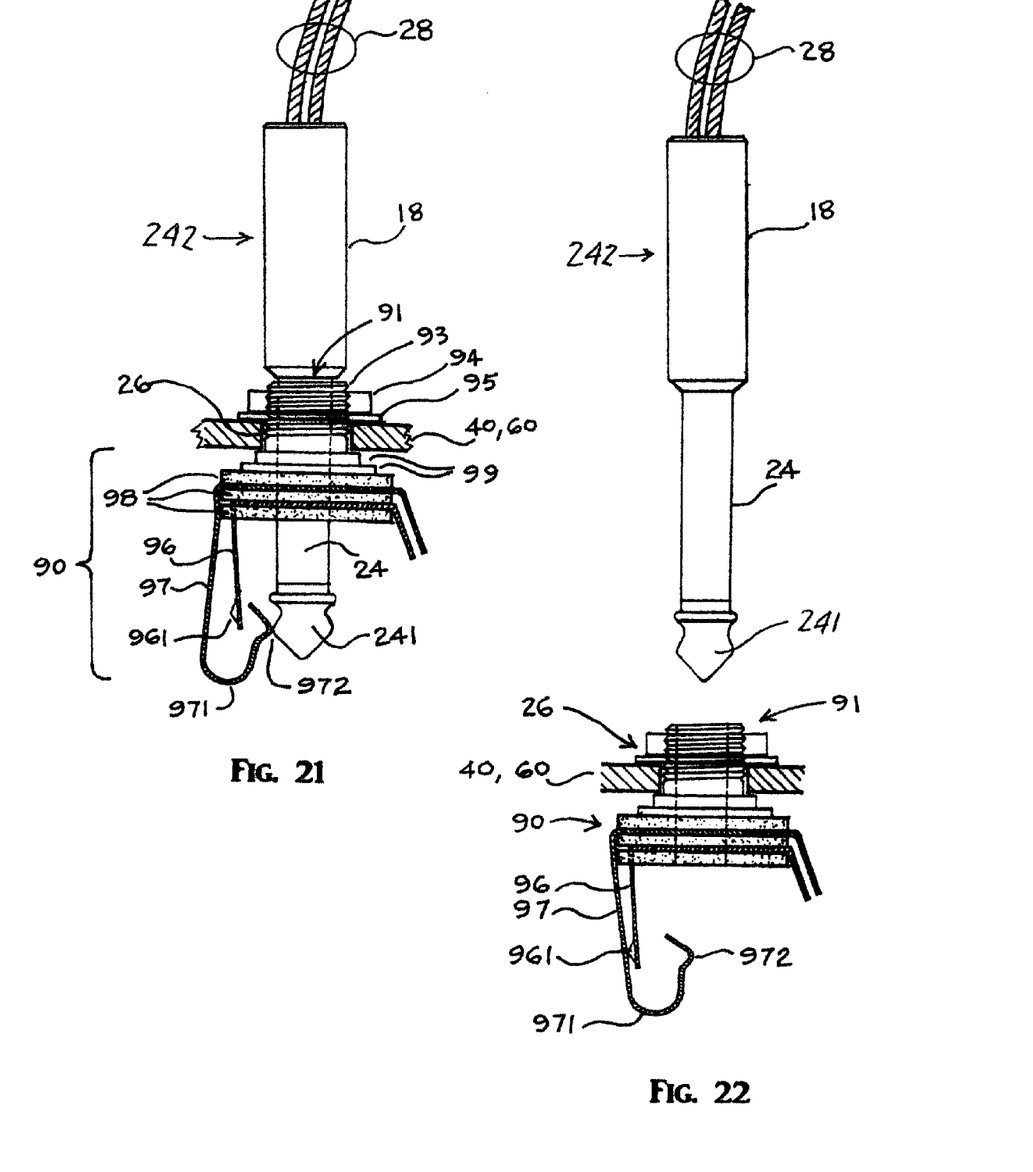
FIG. 21 is an enlarged partially sectional view showing the actuation pin or plug of the present invention in storage, or OFF, position.
FIG. 22 is an enlarged partially sectional view like FIG. 21 and showing the pin or plug removed actuating the present invention for placement use.

FIGS. 21 and 22 are partially sectional views of the position and function of the plug or pin 24 used for actuating and de-energizing the device of the present invention. As illustrated in FIG. 21, the plug or pin 24 is adapted to pass through port 26 formed in the each of the two parts 40, 60 that form the casing enclosure of the present invention. The port has an internal portion 90 and an exterior portion 91 that form a hollow entry for a portion 92 of the plug or pin 24. The exterior portion 91 has a threaded portion 93 and is held in place in the enclosures port 26 by mounting nut 94 and insulating/sealing washer 95. The interior portion 90 of the port 26 includes insulated electrically conductive contact elements 96 and 97 that are insulated from each other by suitable insulation materials 98 and have cutout portions for the passage of the interior portion 92 of the plug or pin 24. The interior portions are held in place in the interior of the enclosure by shouldered portions 99 that become secured to the enclosure as the nut 94 is tightened against the exterior of the enclosure. The innermost portion of the plug or pin 24 is an insulated tip 241 and the exterior of the plug or pin 24 is formed of an insulating material 242

As shown in FIGS. 21 and 22, the contact element 96 includes a contact surface 961 and the contact element 97 is formed with a return bent portion 971 with a further formed bend at 972 that is in position for alignment with the insulated tip 241 of the plug. Elements 96 and 97 are self spring biased toward each other and element 97 is biased toward the center of the interior portion of the plug 24. When the plug 24 is inserted, the portion 972 is urged away from the interior portion 92 to separate the contact 961 from the element 97 and when the plug is removed from the port 26, the portion 972 is released and, being biased toward the center where the plug was, the contact 961 makes electrical contact with the element 97 to energize the device for purposes to be described hereinafter.

Figure 23:
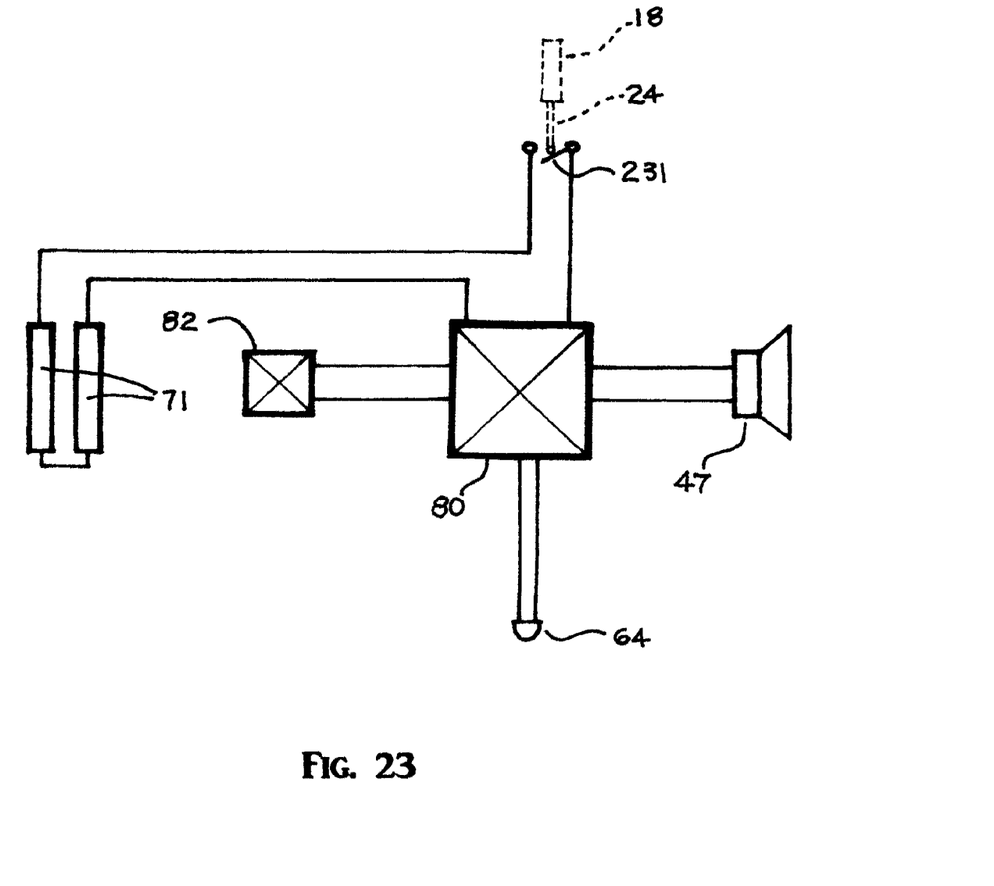
FIG. 23 is an electrical block diagram of elements within the molded interior of the present invention.

FIG. 23 is a simplified electrical block diagram of components that are included in the interior of the device of the present invention. The electrical energization of the device is accomplished by action performed as plug or pin 24 is withdrawn from the port 26 closing switch 231. The illustrated switch is the simplified illustration of the contact between contact 961 and the element 97 (see FIGS. 21 and 22) so as to provide power from the batteries 71 to the interior of the device by energizing the integrated circuit board 80. The integrated circuit then energizes the ground positioning device (GPS) 82, the speaker 47, and the light source 64 (LED), and any other functional element within the enclosure. The integrated circuit board is adapted to be programmed to accomplish and energize many different operations of elements within the enclosure as will be described.

USE AND OPERATION OF THE INVENTION

The present invention is useful in identifying and marking a particular location for later return to that location. It has particular use by a hunter that has identified and shot a game bird or animal and wants to retrieve the game as a later time. It can be used to locate a first shot bird or animal while a second is being pursued.

When used, the device 10 can be attached to something on or with the user, such as attached to a belt loop, pocket, jacket or the like at a location that is easily grasped by the user. When it is desired to use the device it is easily released from the storage position and then thrown or launched by hand or possibly by a sling or compressed air or gas to a position that is to be marked. In the case of a hunter's use, the device can be launched to the approximate location of a downed bird or game while the hunter is pursuing another game object. In the form herein shown, the device is removed from its attachment to a belt by a looped lanyard or rope attached to a pin or plug that can be removed from the device to actuate its audible, visual or electronic signaling or beacon functions. The user then launches the device to the area to be marked. As shown in the attached figures, the device 10 has a removable pin or plug that, on release from the device permits a switch to be closed to energize elements within the enclosure of the device.

The device preferably has a built-in time delay between launching, actuating and the emitting of the signals. The delay can be used to prevent the flushing of additional game in the area or may prevent "spooking" a hit, but not killed, game. In at least one preferred form the audible sound is like that made by crickets and the visible light is of a color (such as blue) that is more easily seen by humans. The audible and visual signals can be intermittent (every 3 seconds) and may be interrupted after a fixed time period to begin again after some fixed time period. Audible signals may be generated by a signal generator or a piezoelectric device and may be a ping or buzzer sound. The batteries of the device will be of such design to permit operation for a number of hours or days until the device is turned OFF or retrieved. The enclosure of the device is substantially water proof and sealed against ambient water and is constructed of a material that will withstand impact when the device is landed in use. The device is of a size to be easily grasped in the hand of a user (either right or left side) and with enough weight for easy launching so as to be able to be thrown 50 to 100 feet if needed. The exterior of the device should be of a color that will stand out in the surrounding area—luminescent; yellow or red are suggested colors, so as to be seen easily when being retrieved.

The elements in the preceding descriptions are intended to accomplish a variety of discernable sounds, visible signals, or electronic connectable signals that will permit the user of the device of the present invention to be able to place the device and later retrieve it as well as an object that the placed device was intended to identify. The device has many uses but one significant use is by hunters that want to locate a shot or wounded game that they have been hunting, then by supplying a signal to the user as an assist in retrieving the device and/or the game that was being hunted, or where to start a search.

The signal can be audible or visual in many forms and can be designed to prevent a downed game from being alarmed to cause that game to move away from the area. Radio signals of a variety of frequencies could be used to identify and locate different devices. The device is retrievable and resettable so as to be reused when retrieved.

It is estimated that hunters, bird hunters in particular, are unable to recover approximately 30% of their downed game due to loss of visibility of the downed location, dense woods and brush, heavy rock cover and other adverse conditions at the location where the game mat have landed. This reduces the valuable experience to the hunter in his pursuit of a shot game, effects the process of game stocking because the otherwise lost game is now replaced by additional hunting permitted by state game limits, and, at the same time, reduces the chance that a wounded but not-killed game suffers as it tries to avoid being captured.

The purpose of the present invention is a device that aids a game hunter to fix the location of the downed game in difficult terrain under condition that commonly lead to lost game by permitting the hunter to throw a signaling device to the downed game location and to use that signal as a locator for game retrieval that could be lost without such an aid.

The device of the present invention can include several signaling methods such as sound, light, vibration or color. Initial testing of devices for possible sound, weight and shape for effective tossing and hearing have indicated that the device should provide: volume of sound sufficient to easily be heard from 100 feet in no wind, volume of sound sufficient to be easily heard from 50 feet in 30 mph wind, considered only loud enough and compatible with surrounding sounds to avoid scaring a wounded bird away from the placed device; 100 feet is probably further than the wounded bird would fall from the hunter.

The device can be adjusted or designed in sound and amplitude to overcome the poorer hearing capability particular to aging that may cause frequency deafness at the sound emitter pitch. Those issues could be compounded by the explosive sound from hunting weapons near the shooter's ear repeatedly over time, the frequency of the sound from the device should be at a lower frequency as (compared to louder), and sound immittance specific to hearing impairment common in the hunting population. Possible sound patterns to improve audibility thresholds could be wavering and cycling patterns involving intermittent sounds, warbling common to emergency response vehicles, programmed cycling in frequency/tone, pulsing, popping, hissing, tonal, explosive, animal sounds such as insects, crickets, birds, screech owl, and siren sounds.

The device should have sufficient volume, types of sound character, and intensity to be distinguishable in various weather conditions and terrains which deaden and diffuse sound energy; including 30 mph wind, snow back, heavy brush cover, rocky terrain where it may be lost in rock crevices and pockets, water puddles, soft earth and sand.

The sound made by the device may need to be programmed to minimize driving animals away by using intermittent sound, sound patterns designed to minimize such effects on the animal based on testing; this effect may not be of great concern with bird hunting, but may be a concern with other types of game, such as deer which can move long distances when wounded.

Development of the useful device may lead to placement of multiple sound emitters at different sides/locations on the device, and a placement of emitters that will assure that if the device is covered by earth, rock, sand, or other absorbers, at least one emitter will be exposed to un-restricted sound immittance.

Other options for signaling could include,

LIGHTING; placing flashing intense light (blue), as commonly used for emergency response vehicles in bright daylight, LED lighting which has become very popular for flashlights that require low power sources, as with sound immittance requirements multiple lights; LED lighting is particularly suited for this condition, allowing inexpensive multiple lights, LED lighting is easy to protect from impact.

VIBRATION; this can be heard under very adverse and different conditions compared to sound which may only be transmitted by air, short range effectiveness, but could assist in dense brush and rocky ground; vibration against a hard object is amplified in air transmittance.

BRIGHTLY COLORED HOUSING; color schemes for daylight visibility are demonstrated with emergency devices, typically a bright yellow and orange with contrasting black lines, fluorescence finishes using nano-particles have become increasing in use that improves visibility in daylight, in dense brush bright colors would still be difficult to see, but among rocks and under water a bright color is an advantage.

SHAPE, SIZE AND WEIGHT; the preferred housing design—shape, size, weight, roll resistance, impact resistance, environmental resistance:

The device should be heavy enough and round enough to be thrown accurately, along the lines of a tennis ball but a little heavier, small enough to fit in a common hunters vest pocket, semi-cube with ergonometric corners and edges, ergonometric shape specifically to enhance throwing effectiveness, shaped and impact absorbing to avoid tendency to roll or bounce when landing on hard ground, rocks or tree limbs and logs, impact resistant to sustain repeated use in rocky terrain thrown 50 feet, modern ABS, TPE materials, and the like, would allow incorporating the high impact resistance with a tough, flexible exterior over a more spongy impact absorbing layer, that also provides excellent non-skid surface for throwing with sweaty or wet hands, and good ergonometric feel, water resistant (or water proof to a few feet of water), water puddles and ponds, snow.

Long battery life, provide hours of sound immittance, using common battery sizes and easy replacement.

Device retaining and storage methods, may be stored in a vest pocket, may be stored in a pouch for the pocket and long term storage, may be employed with a pouch mounted to the hunter's belt by belt loop or clip device with various methods of invented attachments, may be employed with a clip/mounting device directly on the device and which can be slipped onto the hunter's belt and/or otherwise attached to the hunter's clothing.

Different attachment methods can be provided for mounting the device—the mounting elements can stay attached to the device, the mounting elements can be pulled away from the clip on deployment, each mounting method offers different benefits, the intent of the mounting method is to permit it to be readily and quickly available for the hunter to rapidly grab and toss the device with little fumbling and miss steps, the mounting may need a release button or device to be pressed in order to extract the device, which offers the advantage of securely holding the device to the hunter when thrashing through dense brush or falling or brushing against rocks, but not unduly hinder rapid and easy release of the device for deployment.

For some hunters common throwing ability may be impaired; an option when using the present device would be to advance a few yards, then again toss the position locator beacon; the hunter would need to keep an eye on a distant target in order to retain orientation for a second throw.

The unkilled bird is the hardest bird to find, and is the condition where the present device is used to its best advantage; if the bird is still alive, it hides; if it is dead it doesn't move and may become hard to find in heavy cover.

The activation of the device may have several choices—It may be automatically activated by being pulled from some type of clip or mounting on the belt of or clothing; it may be activated by impact (although this may be less reliable) because the device may land in a very soft bush and thus not activate an impact sensor; many deployments will be against a cushion of grass blades, weed stems or brush.

The belt clip is believed to be the most reliable, for example when the device is withdrawn from the clip, one or more of the signalers is activated by pulling a pin from a spring loaded switch.

The storage and deployment process should integrate easily with gun handling and safety—The device should be possible to be deployed from left and right hand sides; it should be in reach of the desired hand while holding the gun safely; it should allow switching of the gun and device between hands without losing control of either the gun or device; in particular the handling of the device should enable safety rather that introduce another variable of difficulty in potentially intense situation; the means for deploying two or more locators will be valuable to the hunter who is shooting multiple game at once.

The GPS device 82 can also be programmed or integrated with the use of a mobile telephone system to provide visible land coordinates for the position of the placed device, a map and/or relative position between the landed device and the user. The device can include an antenna for the transmission and receipt of signals.

As herein described the position locator beacon is useful in locating a marked specific position or object with respect to the user and is described as a self contained casing of hand-holdable size for enclosing several beaconing components that can provide a plurality of dectable signals to the user. The device is designed to be attachable to some part of the user or clothing and is easily detached from that attachment. The release of the device from its mounting attachment activates its internal signal generating components after a reasonable time delay and continues the transmitting of sight, sound or electronic signals for a reasonable length of time. The casing is designed and constructed of impact resistant material and is substantially waterproof. The casing is designed to be of a size and weight to be easily thrown or launched to a markable position and has an exterior configuration that inhibits rolling or sliding after being placed in a landing position. The casing can enclose a battery power supply, an integrated circuit board designed for timing, energizing and controlling signals from an audible source, a light source, a GPS signal generator, an antenna for sending and receiving signals, and other possible elements that could be useful in finding a placed device or some article that was to be marked.

The benefits of the present device are: it can stop loss of hunters valuable game; saves trophy game; saves live bird stock by hunter not having to replace a lost bird in his limit (an important conservation measure); reduces suffering of wounded animals; enhances hunters experience of success; saves ammunition and thus saves money; saves critical search time freeing the hunter to pursue other birds in the flock or game when present; allows for the hunter to immediately engage other game when flushing multiple birds at once; good for improving the use of bird dogs—it is standard operation procedures not to enter "DOWNED BIRD" area before the dog enters, the hunter messes up the smells for the dog, with the locator device the hunter stands back out of the area while the dog searches, the device is perfect for keeping a location identified for follow-up search if the dog is not successful in locating the downed bird, or the bird is un-accessible to the dog; the device is good for tracking large wounded game on the move, especially for bow hunters that need to mark the location of wounded game and return some time later to initiate tracking.

In use by a hunter, the hunter flushes a game bird, fires his gun and watches the game bird drop to earth, without taking his eye off of that location, the hunter grabs the device of the present invention, releases it from its attachment to the hunter, throws the device (or launches it) to the place to mark where the game bird seems to have landed, and then looks for more game birds to be shot. Later, after the device has sent its signals, the hunter returns to that marked location to find the game or sends a dog to do the retrieving. The device has uses for bow and arrow hunters following the above steps and launching the device to a position where the sought game was hit by an arrow. Should the game run after being hit, it should be possible to track the path of the hunted game from the marked location.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:

1. A position locator beacon device for use in locating and retrieving a marked specific position or object with respect to the user, said device comprising:
    a) self-contained casing of hand-holdable size for enclosing beacon components and including a releasable mounting attachment and actuating apparatus,
    b) said casing being impact resistant, substantially waterproof and enclosing powered multiple beacon signal sources for timed controlling of emitting detectable visual, audible or electronic beacon signals that can identify the location of a marked position,
    c) said releasable mounting and activating apparatus including a portion adapted to be attached to the user by a releasable connection to said casing, said releasable connection including an interior set of contacts adapted to actuate some or all of said powered multiple beacon signal sources when said casing is released from said releasable connection,
    d) said casing being sized and weighted to be easily thrown to a markable position and adapted in exterior configuration to inhibit rolling or sliding movement after being positioned.

2. The beacon signal sources of claim 1 including one or more components selected form the group consisting of:
    an audible signal generator,
    a light source,
    a radio signal generator,
    a GPS signal generator,
    a timing device for controlling any of the above,
    an antenna for transmitting radio and GPS signals.

3. The self contained casing of claim 2 having separable parts to enclose a battery power supply source within a sealable compartment, an integrated circuit board for actuating and timing components within said casing, an audio signal sound speaker for generating audible sounds, a light generating source, a ON/OFF switch operated when said device is separated from its mounting attachment, a GPS signal generator, said casing comprising two parts having mating surfaces including water proof sealing surfaces, all of the above contained within said casing.

4. The self contained casing of claim 1 constructed of impact resistant material and having a shape that conforms to the hand of a user and is aerodynamically smooth to permit ease of being transportable to a position to be marked.

5. The self contained casing of claim 3 having sound penetrating surfaces in sound communication with said internal audio signal sound speaker.

6. The self contained casing of claim 3 wherein said ON/OFF switch comprises a female entry port through said casing into said interior set of contacts and a male plug member for passing through said entry port to control said interior set of contacts, said interior set of contacts being biased toward each other under resilience of said contacts, and said male plug separating said set of contacts when inserted and placing said contacts in an OFF position.

7. The separable contacts of claim 6 being operable to connect and interrupt power to said internal components when said male plug is withdrawn from said casing.

8. The beacon of claim 1 adapted to be placed or thrown or launched to serve as a marker for a specific location or an object, said placement being launched by being thrown by a user, or launched by a sling or by compressed air or by gas means for launching to a specific location.

9. The beacon of claim 2 wherein said audio signal generator is a speaker actuated by a signal generator or a piezoelectric transducer.

10. The beacon of claim 9 wherein said audio signal generator is a speaker energized to produce sounds in the form of natural sounds selected for the group consisting of birds, insects, amphibians or repeating ping or buzzer sounds.

11. The beacon of claim 2 wherein said timing circuit includes a time delay between placing said beacon and the start of said beacon signal sources.

12. The beacon of claim 2 wherein said casing includes an antenna for transmitting said signals to and from said radio signal source and wherein said source is controllable in frequency, tone or pulse to provide a single frequency or multiple frequency signals allowing for the identification of individual beacons when multiple beacons are used.

13. The beacon of claim 2 wherein said GPS source is adapted to transmit signals showing the position of said beacon and/or the relative position of said beacon in relation to the user.

* * * * *